(12) United States Patent
Felch et al.

(10) Patent No.: US 12,214,923 B2
(45) Date of Patent: Feb. 4, 2025

(54) FOOD PROCESSING MACHINE AND METHOD FOR RESTRICTING PROCESSES ACTIVATABLE BY AN OPERATOR AT A FOOD PROCESSING MACHINE

(71) Applicant: MULTIVAC SEPP HAGGENMUELLER SE & CO. KG, Wolfertschwenden (DE)

(72) Inventors: Florian Felch, Sulzberg (DE); Felix Mayer, Erolzheim (DE); Markus Heineke, Burgberg (DE)

(73) Assignee: MULTIVAC Sepp Haggenmueller Se & Co. KG, Wolfertschwenden (DE)

( * ) Notice: Subject to any disclaimer, the term of this patent is extended or adjusted under 35 U.S.C. 154(b) by 0 days.

(21) Appl. No.: 18/243,705

(22) Filed: Sep. 8, 2023

(65) Prior Publication Data

US 2024/0083617 A1    Mar. 14, 2024

(30) Foreign Application Priority Data

Sep. 9, 2022    (DE) .......................... 102022122909.2

(51) Int. Cl.
    *B65B 63/00*       (2006.01)
    *B65B 43/08*       (2006.01)
    (Continued)

(52) U.S. Cl.
    CPC .............. *B65B 63/00* (2013.01); *B65B 43/08* (2013.01); *B65B 51/00* (2013.01); *B65B 61/02* (2013.01); *B65B 65/003* (2013.01)

(58) Field of Classification Search
    CPC .......... B65B 57/00; B65B 61/26; B65B 9/04; B65B 3/02; B65B 3/04; B65B 41/00; B65B 59/02

(Continued)

(56) References Cited

U.S. PATENT DOCUMENTS 6,473,656 B1    10/2002    Langels et al.
7,010,898 B2    3/2006    Michel
(Continued)

FOREIGN PATENT DOCUMENTS

DE       19624929 A1    1/1998
DE       10210280 A1    10/2002
(Continued)

OTHER PUBLICATIONS

German Search Report re DE App. No. 10 2022 122 909.2 dated May 5, 2023; Applicant; Multivac Sepp Haggenmueller Se & Co. KG (with English machine translation) (10 pages).

(Continued)

*Primary Examiner* — Jacob A Smith
(74) *Attorney, Agent, or Firm* — Brooks Kushman P.C.

(57) ABSTRACT

A food processing machine includes a plurality of tool parts which are exchangeable and which each comprise at least one electronic data storage in which a tool identification is stored for identifying the respective tool parts, and a controlling system for reading the tool identifications. The controlling system is configured to determine, based on the tool identification read by it from the at least one data storage of an exchangeable tool part installed at the food processing machine, processes basically implementable with this tool part which are possible for an operation of the tool part, and to determine an intersection of detailed processes by a comparison of these processes with processes basically performable by the food processing machine based on machine equipment employed for the tool part and firmly installed in the food processing machine, by which the tool part can be controlled by the machine equipment provided for it.

12 Claims, 8 Drawing Sheets

(51) Int. Cl.
  B65B 51/00 (2006.01)
  B65B 61/02 (2006.01)
  B65B 65/00 (2006.01)
(58) Field of Classification Search
  USPC .............. 53/128.1, 135.1, 452, 473, 52, 559
  See application file for complete search history.

(56) References Cited

U.S. PATENT DOCUMENTS

| | | | |
|---|---|---|---|
| 7,117,040 B2 * | 10/2006 | Masuda | G05B 19/056 700/20 |
| 11,418,359 B2 | 8/2022 | Ehrmann et al. | |
| 2004/0187443 A1 * | 9/2004 | Michel | B65B 57/00 53/559 |
| 2006/0155397 A1 | 7/2006 | Focke et al. | |
| 2019/0064768 A1 * | 2/2019 | Tanaka | G05B 19/4065 |

FOREIGN PATENT DOCUMENTS

| | | | |
|---|---|---|---|
| DE | 10129392 A1 | 1/2003 | |
| DE | 102016125132 A1 | 6/2018 | |
| EP | 1460502 A2 | 9/2004 | |
| EP | 1401632 B1 | 11/2006 | |
| EP | 3494054 B1 | 6/2021 | |
| WO | WO2021160472 A1 * | 8/2021 | ............. B65B 57/18 |

OTHER PUBLICATIONS

European Search Report, EP Application No. 23195067.6, Applicant: MULTIVAC Sepp Haggenmueller SE & Co. KG, Jan. 22, 2024 (with English machine translation) (16 pages).

* cited by examiner

FOOD PROCESSING MACHINE AND METHOD FOR RESTRICTING PROCESSES ACTIVATABLE BY AN OPERATOR AT A FOOD PROCESSING MACHINE

CROSS REFERENCE TO RELATED APPLICATIONS

This application claims foreign priority benefits under 35 U.S.C. § 119(a)-(d) to German patent application number DE 102022122909.2, filed Sep. 9, 2022, which is incorporated by reference in its entirety.

TECHNICAL FIELD

The present disclosure relates to a food processing machine and to a method for restricting processes activatable by an operator at a food processing machine.

BACKGROUND

By tendency, food processing machines, in particular packaging machines, should be applicable flexibly, that means they should be able to produce various products. Due to the increasing range of products, an increasing amount of exchangeable tools for the manufacturing process are therefore employed at food processing machines. As a consequence of the increasing diversity of various tool assemblies, adjustment procedures are becoming ever more complex for operators, the consequence possibly being that conversions and optionally process sequences adjusted during the start of the machine in this respect are prone to errors. Thereby, interruptions of the running operation can often occur, driving up manufacturing costs. In particular, the adjustment procedures also become increasingly difficult because in combined tool assemblies formed of a plurality of cooperating tool parts, individual tool parts of them are exchangeable to develop an extended processing range.

DE 10 2016 125 132 A1 discloses a packaging machine with a bus node arrangement. The bus node arrangement is fastened to the outer side of a workstation of the packaging machine and provides, via a communication bus connected to it, information on the tool of the workstation, for example, an identification of the tool, for a controller of the packaging machine. Thereby, the tool installed in the workstation can be clearly identified. Moreover, by means of the identification of the tool, the whole operation of the packaging machine can be matched to the respective tool.

SUMMARY

Against this background, it is an object of the disclosure to provide a food processing machine and a method which make it easier for an operator to easily and as quickly as possible adjust the operation of the food processing machine to an optimal operating point in view of a special machine configuration provided for a certain product.

This object is achieved by a food processing machine according to the disclosure and by a method according to the disclosure.

The present disclosure relates to a food processing machine which is in particular configured in the form of a packaging machine, for example as a deep-drawing packaging machine or as a tray sealing machine, for producing individual packages from a packaging material. The food processing machine according to the disclosure comprises a plurality of tool parts which are exchangeable and which each comprise at least one electronic data storage in which a tool identification is stored for identifying the respective tool parts, and a controlling system connected with the respective data storages for reading the tool identifications stored therein.

According to the disclosure, the controlling system is configured to determine, on the basis of at least one tool identification read by it from the data storage of an exchangeable tool part installed at the food processing machine, processes basically implementable with this tool part and which are possible for an operation of the tool part, and to furthermore determine an intersection of detailed processes by a comparison of these processes with processes basically performable by means of the food processing machine with machine equipment employed for the tool part and firmly installed in the food processing machine, based on which the tool part is controllable based on the machine equipment provided for it. The controlling system provides the intersection of detailed processes resulting in view of the tool part and in view of the machine equipment present for it, in particular as processes for the operation of the food processing machine selectable by an operator at the controlling system, for example at an input unit formed thereat as a display. By this, the adjustment procedure of the food processing machine can be facilitated in view of the exchangeable tool part actually installed thereat.

By means of the controlling system according to the disclosure, one can thus initially determine, for example during a machine start and/or a conversion procedure of the food processing machine, which processes are possible at all with the installed tool part which is present, for example, as an upper tool part, a lower tool part, or as a module fastened to it in a releasable manner. In other words, by means of the controlling system according to the disclosure, before the actual manufacturing process, it is initially determined which processes can be carried out using the exchangeable tool part, this means processes that can be potentially carried out with it. These tool processes are in particular sensor-controlled tool processes which can be carried out with the tool part, such as e.g., heating intervals, marches of evacuation pressure, marches of gas-injection pressure, forming processes, sealing processes and/or cutting processes. The implementable processes are in particular defined by especially controlled and/or dynamically controlled process sequences, for example, process sequences that are guided by characteristic curves, at least assisted by characteristic curves, and/or dynamically cascaded process sequences which are implementable by means of the tool part.

By means of at least one embodiment according to the disclosure, above all, a plurality of processes that are basically possible with the firmly installed machine aggregates for the operation of the food processing machine, but that are not possible for the operation of the installed exchangeable tool part, can be identified as non-selectable processes for the present machine assembly and be set to a non-activatable state, so that they cannot be erroneously selected and set with operating parameters by an operator during the adjustment of the machine. This facilitates the adjustment procedure and prevents faulty adjustments which can result in manufacturing delays.

The disclosure permits to automatically restrict the processes selectable by an operator for an operation of the food processing machine at least to processes that correspond to the processes actually implementable with the exchangeable tool part especially installed in the machine, even if the food processing machine includes firmly installed aggregates which can perform additional processes in combination with at least one other exchangeable tool part that can be employed instead of the tool part actually installed for the operation. This combined automatic restriction of selectable processes related to the tool and the machine equipment, for example selectable sealing, forming and/or preheating processes, makes it easy for the operator to adjust the machine control for the manufacturing process.

According to one embodiment of the disclosure, the controlling system is configured to determine an intersection of detailed processes for the present machine assembly by a comparison of the processes implementable with the respective exchangeable tool parts with processes basically performable by means of the food processing machine on the basis of machine equipment employed for the tool parts and firmly installed in the food processing machine, by means of which processes, the operation of the food processing machine can be controlled. It is thus possible that an alignment between the tool processes implementable by a plurality of exchangeable tool parts and the processes implementable with the aggregates employed by the food processing machine for operating the respective tool parts takes place based on which the processes selectable by the operator can be restricted for a plurality of tool parts at a time, i.e., can be further restricted. As a consequence, only those processes are provided for selection by the operator when he/she is adjusting the machine which are possible with the special tool combination and the general aggregate assembly of the food processing machine provided for the operation thereof, that means with its firmly installed machine equipment. In other words, an increasing restriction of detailed processes that is maximally selectable by the present machine configuration is formed thereby. Thus, the present variant compares the tool assembly of a plurality of exchangeable tool parts with a machine equipment provided for it to find out the maximum of selectable detailed processes from them. Here, even for a certain tool combination that can be employed at various machine types, different detailed processes can be selectable for the operation of the respective machine types depending on the aggregates installed therein.

Preferably, the machine equipment is predetermined by at least one pneumatic, electric and/or electromagnetic drive. On the basis of the performance data of such drives, certain tool processes can be performed with them which can be made available for the controlling device for comparing them with the tool processes possible with the tool assembly to determine the intersection of detailed processes therefrom.

In one variant, the food processing machine includes a plurality of workstations arranged one behind the other in the production direction, wherein the tool parts are installed at the same workstation or at different workstations. In particular, the two tool parts can be installed separately or together at a preheating station, a forming station, a sealing station and/or a cutting station.

The controlling system can in particular be configured to determine, on the basis of a plurality of tool identifications read by it from the respective data storages of the exchangeable tool parts installed at the various workstations of the food processing machine, respective processes basically implementable with these tool parts which are possible for an operation of the respective tool parts, and to furthermore determine respective intersections of detailed processes by a comparison of these processes with processes basically performable by means of the respective workstations on the basis of machine equipment employed for the respective tool parts and firmly installed at the respective workstations of the food processing machine, based on which the tool parts are controllable based on the respective machine equipment installed at the workstations. The restriction of the processes selectable by the operator can thereby be easily accomplished for the respective workstations of the food processing machine.

It would be conceivable for the controlling system to be configured to determine, from a combination of the respective tool parts installed at at least one workstation, processes implemented therewith, and to compare them with processes basically implementable with the machine equipment installed at this workstation to obtain the intersection of selectable detailed processes for the respective workstation.

It is advantageous for the controlling system to be configured to divide the intersection of detailed processes into a plurality of subsets of processes implementable by the respective workstations. This results in a process-related division whereby the adjustment procedure can be further facilitated.

In a preferred embodiment, the tool parts are formed by an upper die for a deep-drawing process, by a lower die for a deep-drawing process, by an upper sealing tool part for a sealing process, and/or by a lower sealing tool part for a sealing process. The equipment on the machine side is, in this variant, in particular formed by a vacuum pump, a gas-injection and/or heating means functionally connected with at least one of the tool parts.

Preferably, the food processing machine includes a user interface (HMI) for an operator, for example a touch display, by means of which basic processes of a higher level than the detailed processes, for example preheating, forming and/or sealing, can be displayed to and selected by the operator, by the selection of which, and depending on a prioritization order for the detailed processes made available for the controlling system, the detailed processes can be activated. This leads to a further adjustment aid for the operator since he or she cannot directly access the detailed processes determined automatically by the controlling system in the background, but can mainly select them indirectly via the higher-level basic processes displayed at the HMI. Thereby, the adjustment of the food processing machine becomes even easier for the operator.

It would be suitable for the tool parts provided with the data storage to be each heatable. At these tool parts, on the basis of the heating intervals, temperature-related dependencies result which can have an influence on other process sequences taking place following the heating intervals, which in particular at least temporarily superimpose them, so that a machine control-assisted automatic restriction of the (detailed) processes available by the machine configuration is particularly helpful for the operator.

According to an advantageous variant, the food processing machine provides at least one interface for a data storage, for example for a CompactFlash memory card (CF card), in which an editable reference table of potential combinations of tool parts and machine equipment employed for them are stored. From them, the respective intersections of detailed processes can be read which are available for selection for the operator for adjusting the operation of the respective workstations. Preferably, the data stored in the CF card can be read by means of the controlling system and be used for at least one of the above-described purposes.

In one advantageous embodiment, the controlling system is functionally connected with a cloud-based application by means of which the controlling system can be parameterized with target process parameters for the manufacturing process, in particular the selectable detailed processes restricted by means of the controlling system. These target process parameters can result from a set of regulations stored in the cloud-based application and which can be updated. For a secure previous assignment of the controlling system with target process parameters from the cloud-based application, it would be suitable for a data transfer encoded at least partially by means of an asymmetric method, for example by means of PGP, to take place between the cloud-based application and the controlling system of the food processing machine.

According to one variant, the data storage is configured as an RFID unit. Each tool part can be equipped with such an RFID unit. The food processing machine can be provided with a central RFID reading unit or with a plurality of RFID reading units mounted at the respective workstations.

It would be possible to use the data storage, in particular if it is present as an RFID unit, of at least one of the tool parts employed in the food processing machine as a data storage for storing tool assemblies actually employed at the food processing machine, i.e., combined tool assemblies, for example by generating, by the controlling system, a special coding representing the individual tool parts employed therein, and by storing them in the data storage of at least one tool part employed for it. Thereby, the tool combinations employed for the production of different products series can be stored for future comparable projects and can in this combination be suggested to the operator via the HMI by means of an assistance program installed in the controlling system and/or in the cloud-based application connected with it, during a conversion process as soon as the controlling system identifies at least one tool part from the stored tool combination. This provides an assistance to mount the correct tool parts at the food processing machine.

It would be conceivable for the food processing machine to be a deep-drawing packaging machine, a tray sealing machine, a bag forming, filling, and sealing machine, a labeling machine, a slicing machine or a dough processing machine.

According to a variant, there is a packaging line which includes at least two food processing machines according to the disclosure in the production direction. Here, the respective controlling systems of the food processing machines employed along the packaging line could be interconnected, wherein the respective controlling systems are configured to determine, on the basis of a combination of readable tool identifications of at least two tool parts installed at the food processing machines, processes implementable with these tool parts which are possible for a common operation of the food processing machines, in particular for the operation of at least one workstation employed thereat, optionally including the two tool parts. In particular, for the determination of the implementable processes, from both food processing machines each, at least one tool part employed thereat is taken into consideration.

Furthermore, the disclosure relates to a method for restricting processes activatable by an operator at a food processing machine. The method according to the disclosure comprises the following steps:

reading at least one tool identification, from a data storage of a tool part installed at the food processing machine in an exchangeable manner, by means of a controlling system of the food processing machine functionally connected with the data storage, by means of the controlling system, determining, on the basis of the tool identification read from the data storage of the tool part, processes implementable with this tool part which are possible for an operation of the tool part, and determining an intersection of detailed processes by means of the controlling system by a comparison carried out by it of the processes implementable with the tool part with processes basically performable by means of the food processing machine on the basis of machine equipment employed for the tool part and firmly installed in the food processing machine, by means of which processes, the operation of the tool part can be controlled with the machine equipment provided for it.

It is thereby possible to detect a present tool assembly combined with the machine equipment at the food processing machine and to determine the detailed processes possible with it by means of which the production operation can run at the food processing machine. Other processes basically performable by means of the machine equipment, which can be performed with another tool part that can be employed instead of the installed tool part, can be set to a non-activatable status and are therefore not selectable by the operator for the present machine assembly.

In an advantageous variant, the controlling system reads, from data storages of tool parts each installed at different workstations of the food processing machine in an exchangeable manner, the respective tool identifications, determines respective processes basically implementable with these tool parts which are possible for an operation of the respective tool parts, and further determines respective intersections of detailed processes by a comparison of these processes with processes basically performable by means of the respective workstations on the basis of machine equipment employed for the respective tool parts and firmly installed at the respective workstations of the food processing machine, by means of which detailed processes the tool parts at the respective workstations can be controlled by means of the machine equipment installed thereat. Thereby, for the respective workstations with exchangeable tool parts installed thereat, the detailed processes selectable by the operator which are available for him when adjusting the food processing machine can be restricted whereby the adjustment procedure of these workstations is facilitated for the operator.

BRIEF DESCRIPTION OF THE DRAWINGS

Embodiments according to the disclosure will be described more in detail with reference to the following figures. In the drawings.

Equal components are always provided with the same reference numerals in the figures.

DETAILED DESCRIPTION

Figure 1:
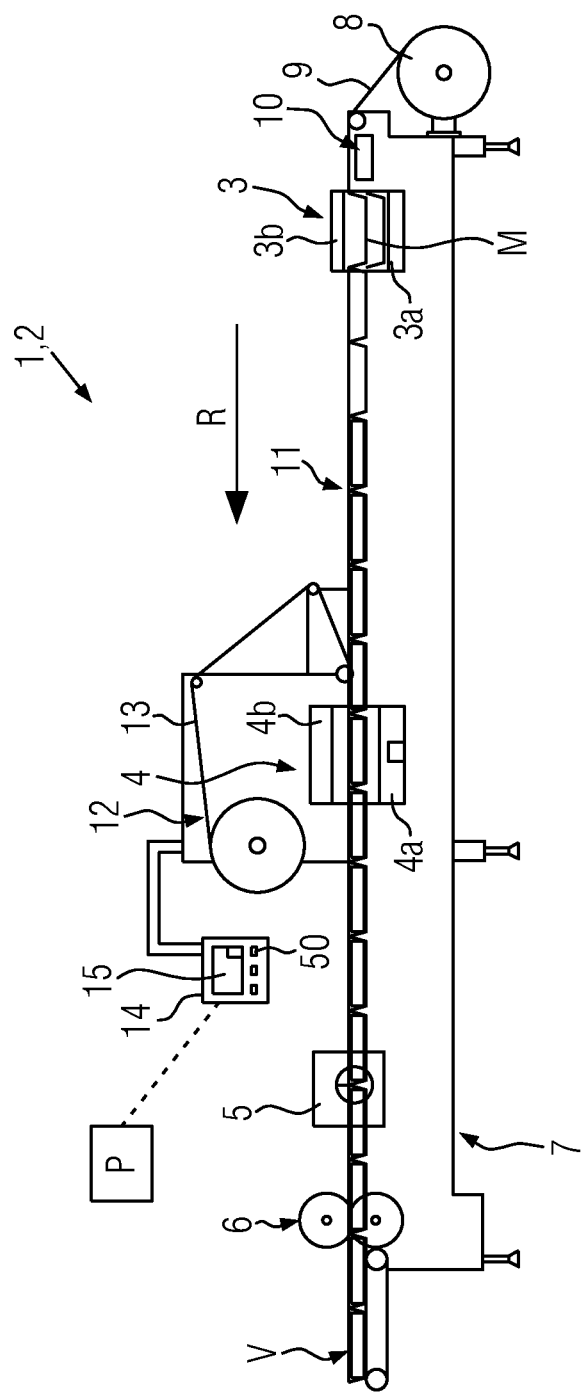
FIG. 1 shows a food processing machine which is present in the form of a deep-drawing packaging machine.

FIG. 1 shows a food processing machine 1 configured as an intermittently operating deep-drawing packaging machine 2. This deep-drawing packaging machine 2 includes a forming station 3, a sealing station 4, a cross cutter 5, and a longitudinal cutter 6 which are arranged in this order at a machine frame 7 in a production direction R. At the entry side, a feed roller 8 from which a lower foil 9 is reeled off is located at the machine frame 7. Furthermore, the deep-drawing packaging machine 2 includes a transport chain 10 which grips the lower foil 9 and transports it further in the production direction R in each main cycle.

In the represented embodiment, the forming station 3 is designed as a deep-drawing station in which troughs M are formed into the lower foil 9 by deep-drawing by means of a lower die part 3a and an upper die part 3b, for example by means of compressed air and/or a vacuum. The forming station 3 can be designed such that a plurality of troughs M are formed next to each other in the direction perpendicular to the production direction R. In the production direction R downstream of the forming station 3, a filling section or an insertion region 11, respectively, is provided along which the package troughs M are filled with products. The filling of the package troughs M can be accomplished manually by an operator, or mechanically by a filling means or by a picker.

The sealing station 4 has a lower sealing tool part 4a and an upper sealing tool part 4b positioned above it which are designed to form a hermetically closable chamber in which the atmosphere in the package troughs M can be, for example, evacuated and/or replaced by a replacement gas or a gas mixture by gas flushing before sealing with an upper foil 13 discharged by a foil retainer 12.

The transverse cutter 5 can be designed as a stamping machine which cuts through the lower foil 9 and the upper foil 13 in a direction transverse to the production direction R between adjacent package troughs M. In the process, the transverse cutter 5 operates such that the lower foil 9 is not cut through across its total width, but is at least not cut through in an edge region. This permits a controlled further transport through the transport chain 10.

The longitudinal cutter 6 can be designed as a knife arrangement by which the lower foil 9 and the upper foil 13 are cut through between adjacent troughs M and at the lateral edge of the lower foil 9 in the production direction R, so that individual packages V are present downstream of the longitudinal cutter 6.

The deep-drawing packaging machine 2 furthermore includes a controlling system 14. The latter has the task of controlling and monitoring the processes running in the deep-drawing packaging machine 2. The controlling system 14 has a user interface 15 which serves to adjust process sequences, in particular for selecting process sequences, visualizing and/or influencing the process sequences in the deep-drawing packaging machine 2 for or by an operator, respectively, during the commissioning of the deep-drawing packaging machine 2. The controlling system furthermore comprises an interface 50 for a data storage, in particular for a CF card. Such an interface can also be present at the machines described below.

Figure 2:
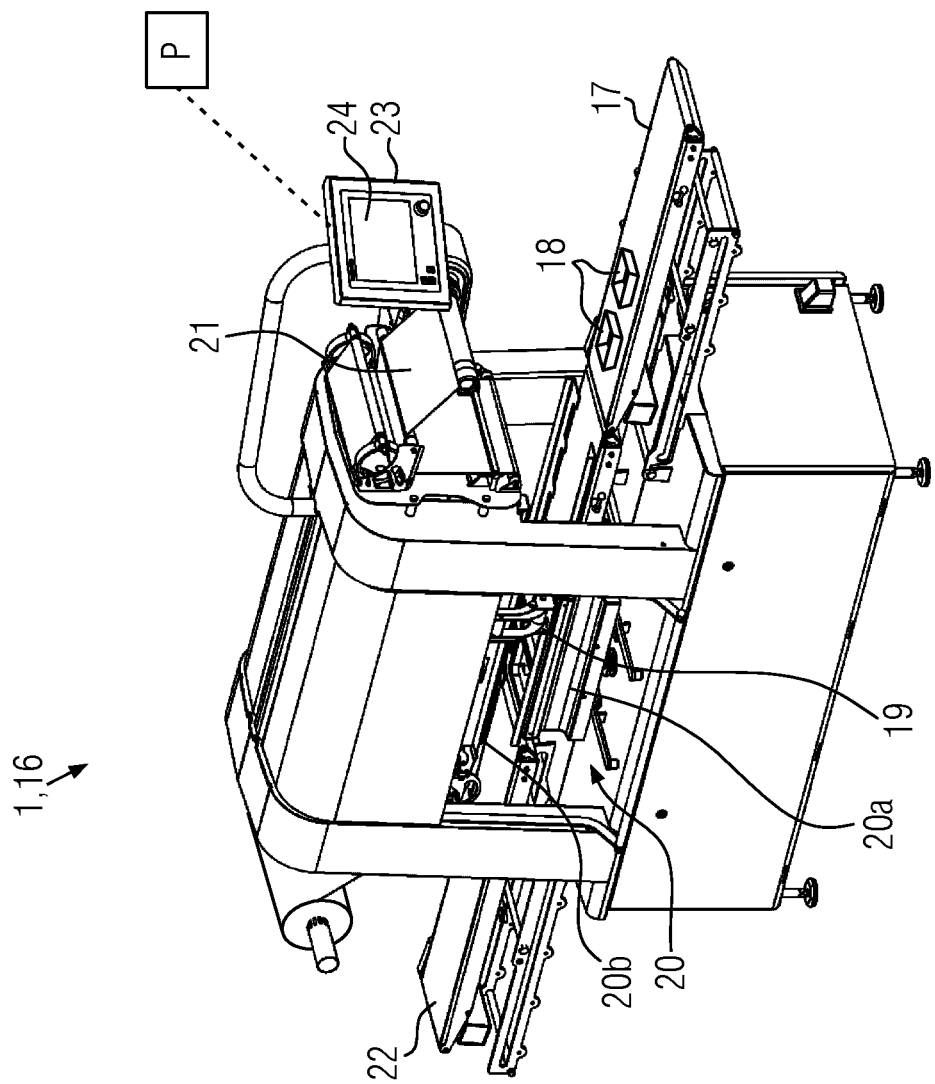
FIG. 2 shows a food processing machine which is present as a tray sealing machine.

FIG. 2 shows a further food processing machine 1 which is present as a tray sealing machine 16. Such a tray sealing machine 16 is also referred to as a tray sealer by experts. The tray sealing machine 16 has a supply belt 17 on which prefabricated tray parts 18 are transported. Furthermore, the tray sealing machine 16 includes a gripper means 19. By the gripper means 19, the tray parts 18 provided on the supply belt 17 can be picked up and transferred to a sealing station 20 of the tray sealing machine 16 for a sealing process. Tray parts 18 received therein are sealed with an upper foil 21 guided through the sealing station 20. The sealed tray parts 18 are picked up by the gripper means 19 after the sealing process and transferred to a discharge belt 22.

For the sealing process, the sealing station 20 includes a lower sealing tool part 20a and an upper sealing tool part 20b which can be brought together from the opened position shown in FIG. 2 for the process.

The tray sealing machine 16 has a controlling system 23 which is configured to control and monitor the processes running in the tray sealing machine 16. The controlling means 23 has a user interface 24 which is designed to adjust the process sequences at the tray sealing machine 16, in particular to select, visualize, and/or influence them during the commissioning of the tray sealing machine 16.

Figure 3:
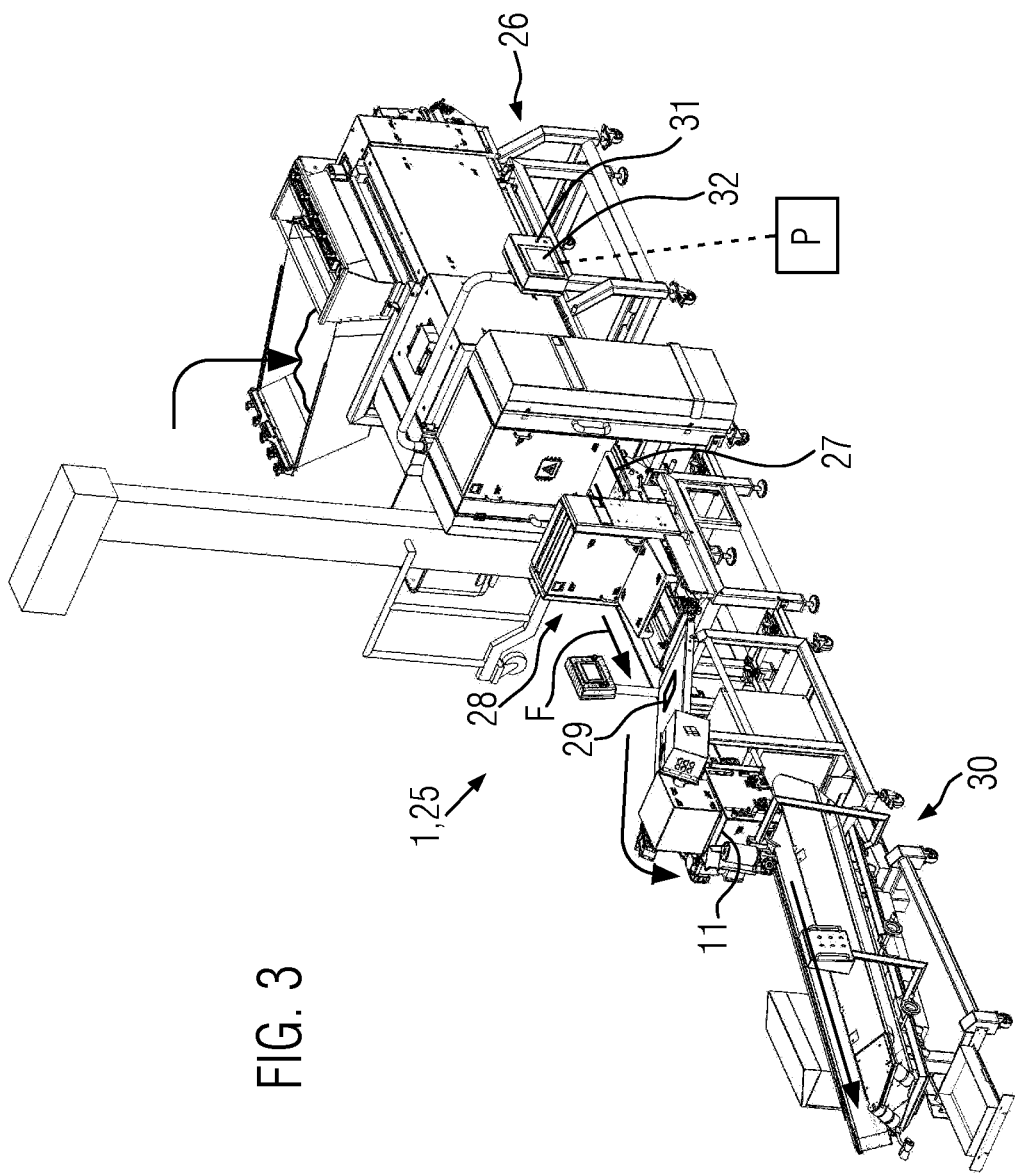
FIG. 3 shows a food processing machine which is present as a dough processing machine.

FIG. 3 shows a food processing machine 1 as a dough processing machine 25 in a schematic, perspective view. The dough processing machine 25 can be configured, for example, to produce bread. It includes a dough strip generator 26 for producing a strip of dough 27, and a dough strip cutter 28 which is configured to separate a mass of dough 29 from the strip of dough 27, preferably transverse to the production path F.

Furthermore, the dough processing machine 25 can comprise a dough processing device 30. The dough processing device 30 is configured to produce dough articles shaped from the mass of dough 29.

The dough processing machine 25 includes a controlling system 31 with a user interface 32 which is designed to adjust the process sequences at the dough processing machine 25, in particular to select, visualize, and/or influence them during the commissioning of the dough processing machine 25.

Figure 4:
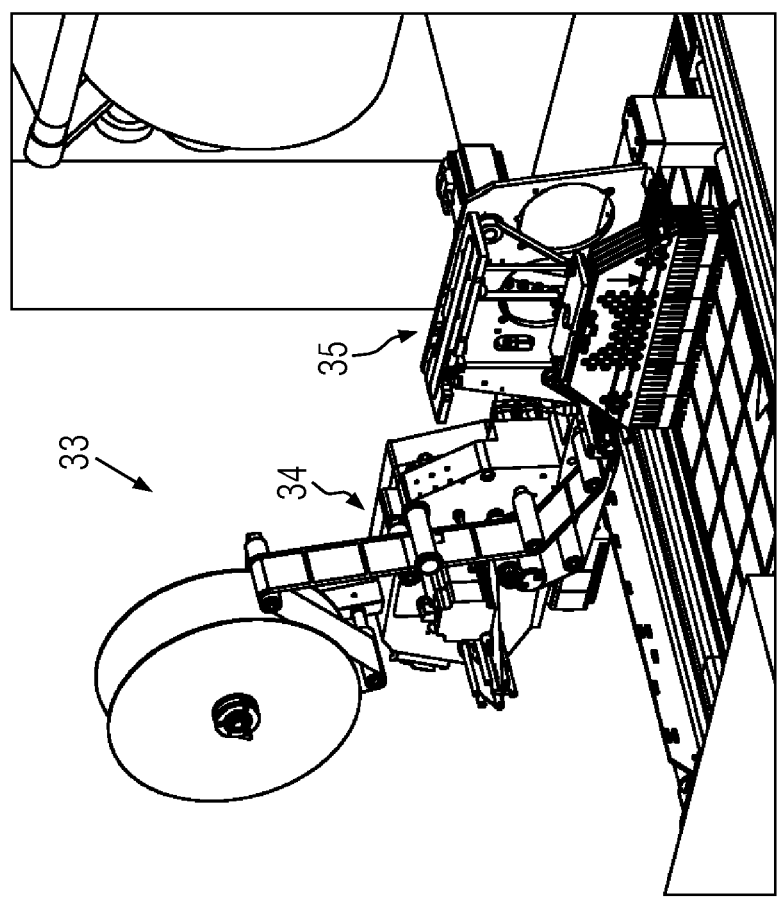
FIG. 4 shows a food processing machine which is present in the form of a labeling machine.

FIG. 4 shows a labeling machine 33 which can be employed, for example, at a deep-drawing packaging machine 2 according to FIG. 1 downstream of the sealing station 4 in the production direction R to apply a label to the sealed packages. The labeling machine 3 includes a labeling dispenser 34 and a pushing assembly 35 for applying the labels. An operation of the labeling machine 33 shown in FIG. 4 can be controlled by means of the controlling system 14 of the deep-drawing packaging machine 2.

Figure 5:
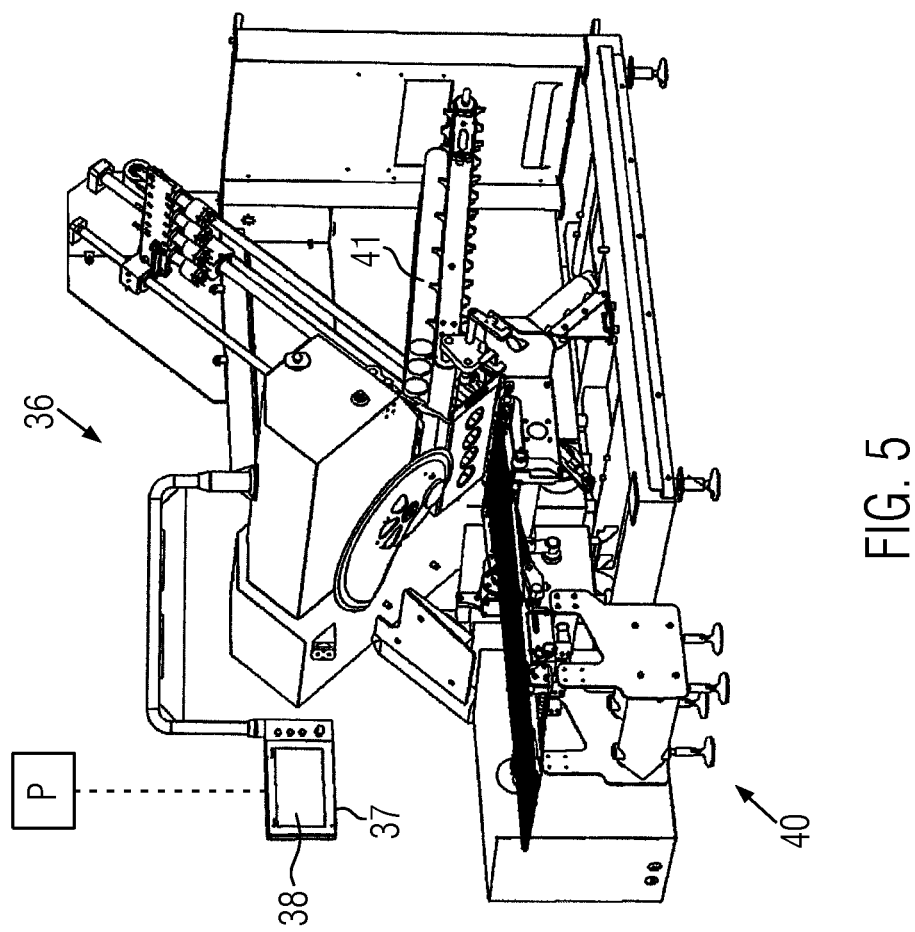
FIG. 5 shows a food processing machine which is present as a slicing machine.

FIG. 5 shows a slicing means 36 for cutting a food product into slices. The slicing means 36 includes a controlling system 37 by means of which the processes running at the slicing machine 36 can be controlled and monitored. To this end, the controlling system 37 includes a user interface 38 for an operator by which the operator can adjust or select, in particular visualize and/or influence, process sequences.

Figure 6:
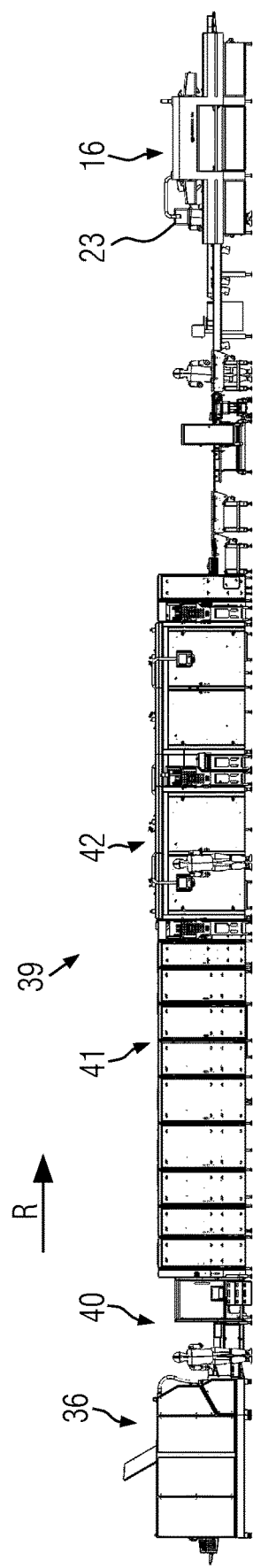
FIG. 6 shows a packaging line including a plurality of food processing machines.

FIG. 6 shows a packaging line 39. The packaging line 39 comprises a slicing machine 36 as it is shown in FIG. 5. In the production direction R downstream of the slicing machine 36, a weighing machine 40 for weighing the cut products is positioned. Further downstream of the weighing machine 40, a plurality of loading stations 41, 42 are arranged and designed to insert the cut products into provided tray parts. The tray parts filled with products are transported to a tray sealing machine 16 arranged at the end of the packaging line 39, as it is shown, by way of example, in FIG. 2, which tray sealing machine produces sealed packages.

The packaging line 39 could, as an alternative to the arrangement shown in FIG. 6, include a deep-drawing packaging machine 1 downstream of the slicing machine 36, as is shown in FIG. 1 by way of example, along which the cut products are inserted into troughs M produced by the forming station 3 and packaged.

Figure 7:
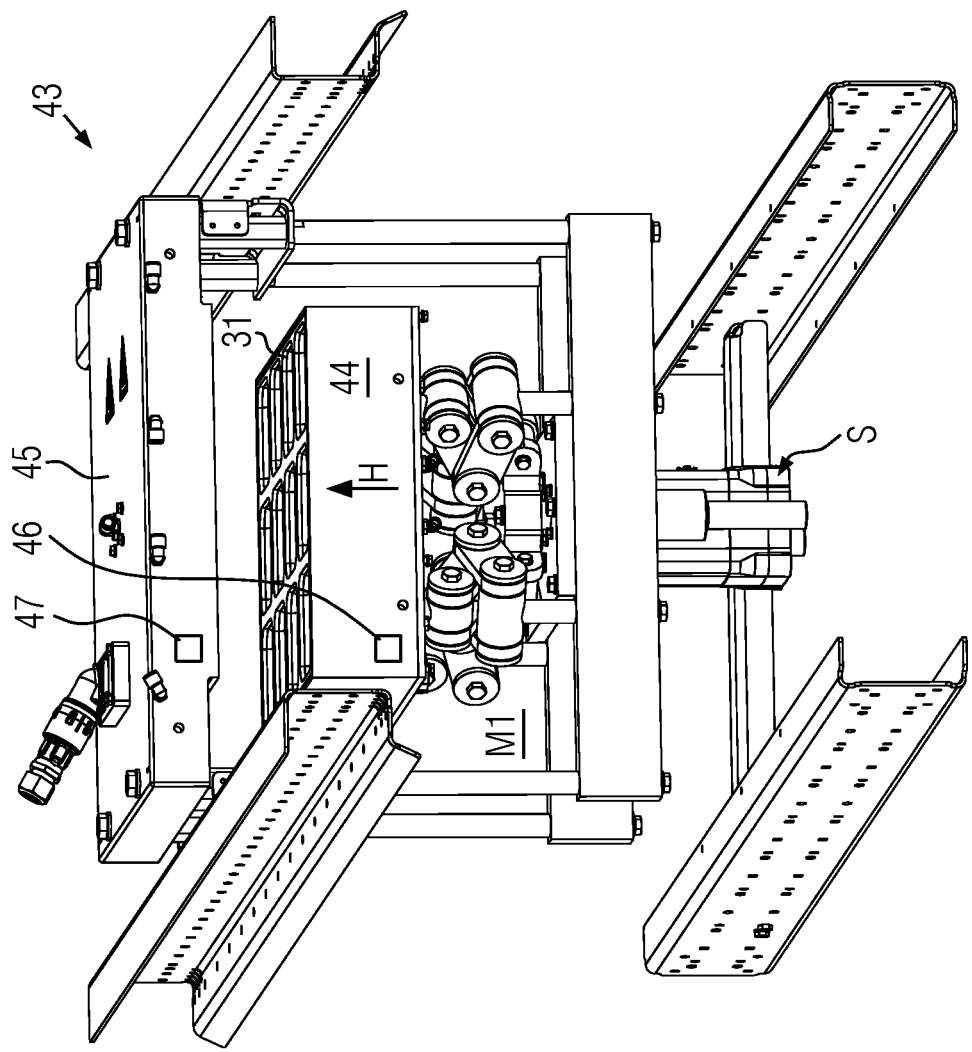
FIG. 7 shows a workstation of a food processing machine with a plurality of tool parts.

FIG. 7 shows a workstation 43 with a lower tool part 44 mounted to be height-adjustable by means of a drive S which is in particular present as a servo motor, and an upper tool part 45 positioned above it. The workstation 43 shown in FIG. 7 can be present, for example, as a sealing station 4 of the deep-drawing packaging machine 2 shown in FIG. 1, or as a sealing station 20 of the tray sealing machine 16 shown in FIG. 2.

FIG. 7 shows that the lower tool part 44 or the lower sealing tool part, respectively, and the upper tool part 45 or the upper sealing tool part, respectively, each include a data storage 46, 47. The respective data storages 46, 47 store at least one tool identification for identifying the respective tool parts, and are in particular designed as RFID data storages.

Figure 8:
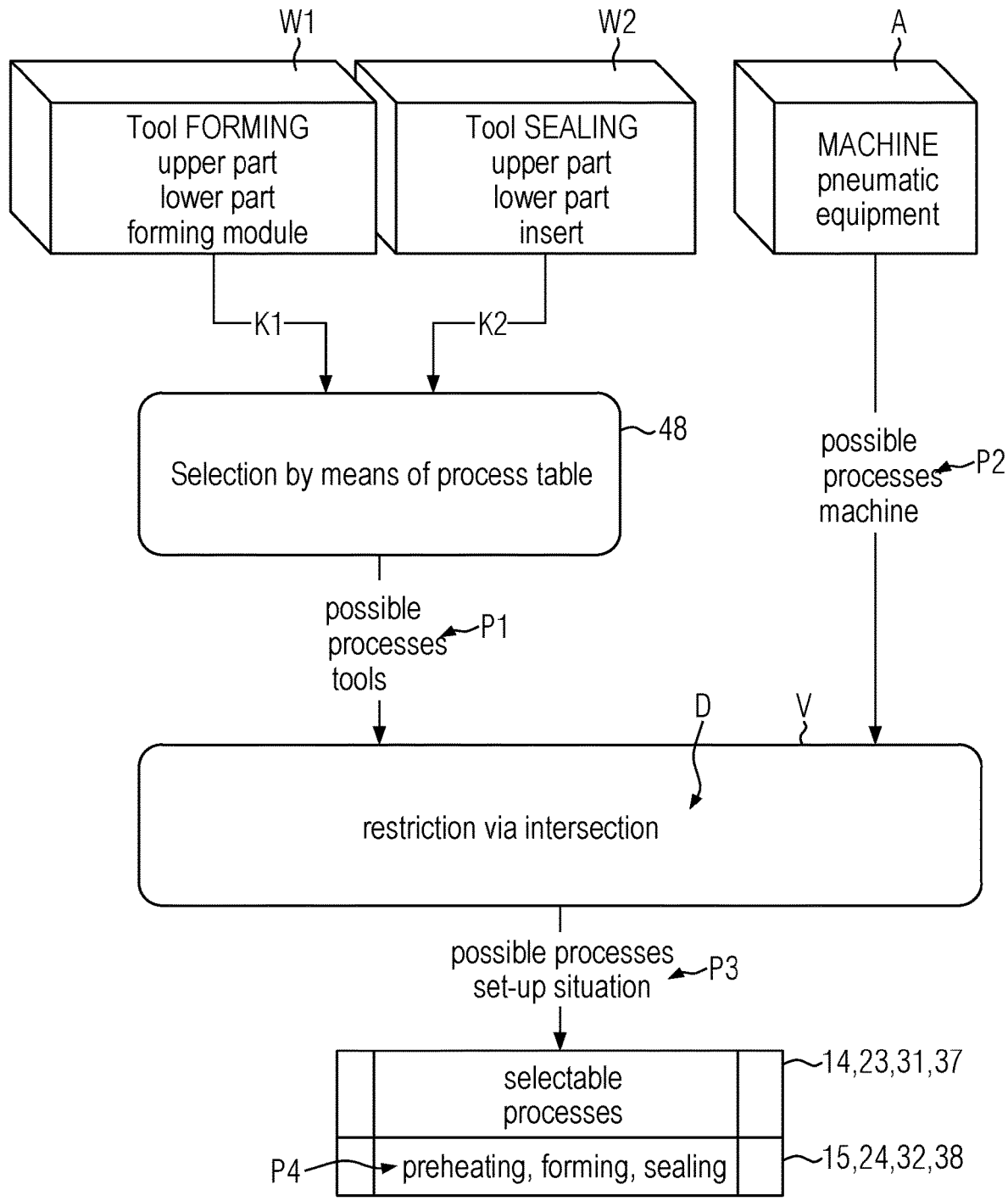
FIG. 8 shows a schematic representation of a method according to the disclosure for restricting processes selectable by an operator at a food processing machine.

FIG. 8 shows, in a schematic representation, a method P which can be performed with all controlling systems 14, 23, 31, 37 shown above in FIGS. 1 to 6.

The controlling method P serves to restrict processes activatable by an operator at one of the above-described food processing machines 1, for example the processes selectable for preheating, forming and/or sealing a foil material. First of all, these identifying tool identifications K1, K2 are read from at least two tool parts W1, W2 installed at the food processing machine 1 by means of a controlling system 14, 23, 31, 37 functionally connected with the tool parts W1, W2. The identifying tool parts W1, W2 could be, for example, the lower sealing tool part 44 and the lower sealing tool part 45 of FIG. 7.

On the basis of a combination of the tool identifications K1, K2 read from the two tool parts W1, W2, processes P1 implementable with these tool parts W1, W2, in particular together implementable by them, are determined which are possible for an operation of the food processing machine 1. The respective controlling systems 14, 23, 31, 37 can derive the implementable processes P1 using a process table 48 which is made available, for example, with a CF card connected with the respective controlling system 14, 23, 31, 37.

FIG. 8 furthermore shows that the controlling systems 14, 23, 31, 37 are configured to determine the processes P2 basically performable by means of the food processing machine 1 with the machine equipment A present thereat.

FIG. 8 furthermore shows that the respective controlling systems 14, 23, 31, 37 perform a comparison V of the processes P1 implementable with the tool parts W1, W2 with the processes P2 basically performable on the basis of the machine equipment A employed for the tool parts W1, W2 and firmly installed in the food processing machine 1, whereby for the present machine configuration, that means for the types of the present food processing machine 1 and the tool parts W1, W2 employed thereat, the maximally possible processes P3 can be determined which are present as detailed processes D determinable, by means of the controlling systems 14, 23, 31, 37, for the food processing machine 1.

Finally, FIG. 8 shows that by means of the respective user interfaces 15, 24, 32, 38, basic processes P4 of a higher level than the detailed processes D are available to be selected by the operator, wherein already by the selection of them by the operator and depending on a prioritization sequence made available for the controlling system 14, 23, 31, 37 of the processes P3 contained in the intersection of detailed processes D, the food processing machine 1 can be automatically adjusted.

As those skilled in the art will understand, the controlling systems 14, 23, 31 and 37, as well as any other controller, unit, component, module, system, subsystem, sensor, interface, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, functions and/or operations described herein, including interaction between and/or cooperation with each other. One or more of such processors, as well as other circuitry and/or hardware, may be included in a single Application-Specific Integrated Circuitry (ASIC) or Electronic Control Unit (ECU), or several processors and various circuitry and/or hardware may be distributed among several separate components, whether individually packaged or assembled into a System-on-a-Chip (SoC).

The disclosure offers an excellent adjustment aid for an operator to adjust a food processing machine 1, within a short time for a desired operation, in view of a combined application of at least one tool part W1, W2 installed thereat in an exchangeable manner with the firmly installed machine equipment A employed for it. The disclosure offers an increased potential for minimizing conversion times in particular for food processing machines 1 where different tool assemblies can be combined and installed, whereby productivity can be increased at such food processing machines 1.

What is claimed is:

1. A food processing machine which is configured as a packaging machine for manufacturing packages from a packaging material, the food processing machine comprising a plurality of tool parts which are exchangeable and which each comprise at least one electronic data storage, in which a tool identification is stored for identifying the respective tool parts, as well as a controlling system which is connected with the data storages for reading the tool identifications stored therein, wherein the controlling system is configured to determine, based on the tool identification read from the at least one electronic data storage of an exchangeable tool part of the plurality of tool parts installed at the food processing machine, processes basically implementable with the exchangeable tool part which are possible for an operation of the exchangeable tool part, and furthermore to determine an intersection of detailed processes by a comparison of the processes basically implementable with the exchangeable tool part with processes basically performable by means of the food processing machine based on machine equipment employed for the exchangeable tool part and firmly installed in the food processing machine, by means of which the exchangeable tool part can be controlled by means of the machine equipment provided for the exchangeable tool part.

2. The food processing machine according to claim 1, wherein the machine equipment is predetermined by at least one pneumatic, electric and/or electromagnetic drive.

3. The food processing machine according to claim 1, wherein the food processing machine comprises a plurality of workstations arranged one behind the other in a production direction, wherein the plurality of tool parts are installed at a same workstation or at different workstations.

4. The food processing machine according to claim 3, wherein the controlling system is configured to determine, based on a plurality of tool identifications read by the controlling system from the respective data storages of respective exchangeable tool parts of the plurality of tool parts installed at various respective workstations of the plurality of workstations of the food processing machine, respective processes basically implementable with the respective exchangeable tool parts which are possible for an operation of the respective exchangeable tool parts, and furthermore to determine respective intersections of detailed processes by a comparison of the respective processes with processes basically performable by means of the respective workstations based on machine equipment employed for the respective exchangeable tool parts and firmly installed at the respective workstations of the food processing machine, by means of which the respective exchangeable tool parts can be controlled with the respective machine equipment installed at the respective workstations.

5. The food processing machine according to claim 1, wherein the plurality of tool parts comprise an upper die part for a deep-drawing process, a lower die part for a deep-drawing process, an upper sealing tool part for a sealing process, and/or a lower sealing tool part for a sealing process.

6. The food processing machine according to claim 1, wherein the food processing machine comprises a user interface for an operator by means of which basic processes of a higher level than the detailed processes can be displayed to and selected by the operator, by the selection of which and depending on a prioritization sequence for the detailed processes made available for the controlling system, the detailed processes can be determined.

7. The food processing machine according to claim 1, wherein the plurality of tool parts are each designed to be heatable.

8. The food processing machine according to claim 1, wherein the food processing machine provides at least one interface for a data storage in which an editable reference table of potential combinations of tool parts and machine equipment employed for them is stored.

9. The food processing machine according to claim 1, wherein the food processing machine is a deep-drawing packaging machine; a tray sealing machine; a bag forming, filling, and sealing machine, a labeling machine; a slicing machine; or a dough processing machine.

10. A packaging line which comprises, in a production direction, at least one food processing machine according to claim 1.

11. A method for restricting processes activatable at a food processing machine by an operator, comprising:
reading at least one tool identification from a data storage of a tool part installed at the food processing machine in an exchangeable manner by means of a controlling system of the food processing machine functionally connected with the data storage;
by the controlling system, determining, based on the at least one tool identification read from the data storage of the tool part, processes implementable with the tool part which are possible for an operation of the tool part; and
determining, by means of the controlling system, an intersection of detailed processes by a comparison, carried out by the controlling system, of the processes implementable with the tool part with processes basically performable by means of the food processing machine based on machine equipment employed for the tool part and firmly installed in the food processing machine, by means of which the operation of the tool part can be controlled based on the machine equipment provided for the tool part.

12. The method according to claim 11, wherein the controlling system reads respective tool identifications from data storages of tool parts each installed at different workstations of the food processing machine in an exchangeable manner, determines respective processes basically implementable with the tool parts which are possible for an operation of the respective tool parts, and furthermore determines respective intersections of detailed processes by a comparison of the processes basically implementable with the tool parts with processes basically performable by the respective workstations based on machine equipment employed for the respective tool parts and firmly installed at the respective workstations of the food processing machine, by which the tool parts can be controlled at the respective workstations by means of the machine equipment installed thereat.

* * * * *